United States Patent
Ell

(10) Patent No.: US 10,739,371 B2
(45) Date of Patent: Aug. 11, 2020

(54) ACOUSTIC AIRSPEED SENSORS

(71) Applicant: Rosemount Aerospace Inc., Burnsville, MN (US)

(72) Inventor: Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 173 days.

(21) Appl. No.: 15/998,631

(22) Filed: Aug. 16, 2018

(65) Prior Publication Data

US 2020/0057092 A1    Feb. 20, 2020

(51) Int. Cl.
*G01K 11/24*    (2006.01)
*G01P 5/24*    (2006.01)

(52) U.S. Cl.
CPC ............. *G01P 5/245* (2013.01); *G01K 11/24* (2013.01)

(58) Field of Classification Search
None
See application file for complete search history.

(56) References Cited

U.S. PATENT DOCUMENTS

| | | | |
|---|---|---|---|
| 4,031,756 A | 6/1977 | Rotier et al. | |
| 4,038,870 A | 8/1977 | Rotier | |
| 4,112,756 A | 9/1978 | MacLennan et al. | |
| 4,143,548 A | 3/1979 | Graewe et al. | |
| 5,750,891 A | 5/1998 | Brocklehurst | |
| 6,601,447 B1 * | 8/2003 | Loucks | G01P 5/248 73/170.11 |
| 9,121,860 B1 * | 9/2015 | Cronyn | G01P 3/00 |
| 9,612,252 B2 | 4/2017 | Waddington | |
| 10,017,271 B2 * | 7/2018 | Frolov | B64D 43/02 |
| 10,281,307 B2 * | 5/2019 | Lowe | G01F 1/667 |
| 10,364,698 B2 * | 7/2019 | Hodge | G01M 15/00 |
| 2004/0252586 A1 | 12/2004 | Martin | |
| 2010/0186497 A1 | 7/2010 | Choisnet | |

(Continued)

FOREIGN PATENT DOCUMENTS

| | | |
|---|---|---|
| CN | 104897924 A | 9/2015 |
| WO | 2018/002740 A1 | 1/2018 |

OTHER PUBLICATIONS

Extended European Search Report issued in corresponding EP application No. 19191681.6, dated Jan. 8, 2020.

*Primary Examiner* — Natalie Huls
*Assistant Examiner* — Jermaine L Jenkins
(74) *Attorney, Agent, or Firm* — Locke Lord LLP; Daniel J. Fiorello; Scott D. Wofsy

(57) ABSTRACT

An acoustic airspeed sensor system can include at least one acoustic transmitter configured to provide an acoustic pulse, a plurality of acoustic receivers including at least a first acoustic receiver positioned at a first radial distance from the at least one acoustic transmitter and a second acoustic receiver positioned at a second radial distance from the at least one acoustic transmitter. The first acoustic receiver is configured to receive the acoustic pulse at a first time and output a first receiver signal. The second acoustic receiver is configured to receive the acoustic pulse at a second time and output a second receiver signal. The sensor system can include an air data module operatively connected to the first acoustic receiver and the second acoustic receiver. The air data module is configured to determine true air speed (TAS) based upon a first signal delay, a second signal delay, and a wind angle.

17 Claims, 12 Drawing Sheets

(56) References Cited

U.S. PATENT DOCUMENTS

| | | | |
|---|---|---|---|
| 2012/0173191 A1* | 7/2012 | Moeller | ............... G01P 5/22 |
| | | | 702/142 |
| 2012/0179191 A1 | 7/2012 | Macha | |
| 2017/0356303 A1 | 12/2017 | Hodge | |

* cited by examiner

68

70

ACOUSTIC AIRSPEED SENSORS

BACKGROUND

1. Field

The present disclosure relates to air data sensors, more specifically to acoustic airspeed sensors.

2. Description of Related Art

Pitot-static probes work by measuring indirectly the stagnation pressure as moving air is brought to rest (stagnated) when there is no outlet to allow air flow to continue. An angle-of-attack vane (or sideslip vane) works by aligning itself with the local airflow, like an arrow. Such systems can be subject to failures due to icing and heater failures used to de-ice the system. Further, the probe faces directly into the air flow, making it a poor configuration to avoid icing because icing tends to accumulate where air flow stagnates.

Ultrasonic anemometers use ultrasonic sound waves to measure air velocity. They measure air speed based on the time of flight of sonic pulses between pairs of transducers. Measurements from pairs of transducers can be combined to yield a measurement of velocity in 2-dimensional flow. Their main disadvantage is the distortion of the flow itself by the transducer supporting structure, which requires a correction based upon wind tunnel measurements to minimize the effect. By mounting the transducers flush with the surface of the aircraft, the distortion of the flow can be reduced and no stagnation points are created. Previous flush mounted systems required sensors upstream and downstream of a sound transmitter, but this is not realistic for over Mach 0.2 airspeed due to power required to get a signal to propagate upstream.

Such conventional methods and systems have generally been considered satisfactory for their intended purpose. However, there is still a need in the art for improved airspeed systems. The present disclosure provides a solution for this need.

SUMMARY

An acoustic airspeed sensor system can include at least one acoustic transmitter configured to provide an acoustic pulse, a plurality of acoustic receivers including at least a first acoustic receiver positioned at a first radial distance from the at least one acoustic transmitter and a second acoustic receiver positioned at a second radial distance from the at least one acoustic transmitter. The first acoustic receiver is configured to receive the acoustic pulse at a first time and output a first receiver signal. The second acoustic receiver is configured to receive the acoustic pulse at a second time and output a second receiver signal. The sensor system can include an air data module operatively connected to the first acoustic receiver and the second acoustic receiver. The air data module is configured to receive the first receiver signal and the second receiver signal, determine a first signal delay between receiving the first receiver signal and transmission of the acoustic pulse by the acoustic transmitter, determine a second signal delay between receiving the second receiver signal and transmission of the acoustic pulse by the acoustic transmitter, receive or determine a wind angle, determine true air speed (TAS) based upon the first signal delay, the second signal delay, and the wind angle, and output a TAS signal indicative of the TAS.

The air data module can include one or more delay measurement modules operatively connected to a pulse control module and the first and/or second acoustic receiver. The pulse control module can be operatively connected to the transmitter and configured to cause the transmitter to send the acoustic pulse at a send time. The one or more delay measurement modules can be configured to compare the send time and the first time to determine the first signal delay and output first delay data indicative thereof. The one or more delay measurement modules can be configured to compare the send time to the second time to determine the second signal delay and output second delay data.

The air data module can include a wind angle module operatively connected to the one or more delay measurement modules to receive the first delay data and the second delay data. The wind angle module can be configured to determine the wind angle based thereon and to output wind angle data. The air data module can include a curve fit module configured to curve fit the first delay data and the second delay data and to output curve fit data to the wind angle module.

The air data module can include an airspeed module operatively connected to the wind angle module to receive wind angle data therefrom. The airspeed module can be operatively connected to the one or more delay measurement modules to receive the first delay data and the second delay data. The airspeed module can be configured to determine TAS based on the wind angle, the first delay data, and the second delay data, and to output the TAS signal.

The air data module can include a speed of sound (SOS) module operatively connected to the airspeed module to receive the TAS signal. The SOS module can be operatively connected to the one or more delay measurement modules to receive the first delay data and the second delay data. The SOS module can be operatively connected to the one or more delay measurement modules to receive the first delay data and the second delay data. The SOS module can be operatively connected to the wind angle module to receive wind angle data. The SOS module can be configured to determine a SOS based on the TAS signal, the first and second delay data, and to output SOS data.

The SOS module can be configured to determine Mach number from the SOS and to output a Mach number signal. The air data module can include a static air temperature module operatively connected to the SOS module to receive the SOS data to determine a static air temperature (SAT) based on the SOS, and to output a SAT signal.

In certain embodiments, the air data module can include a multiplexer (MUX) between the one or more delay measurement modules and at least one other module of the air data module. The MUX can be configured to receive the first delay data and the second delay data from the one or more delay measurement modules and to multiplex the data (e.g., for output to consuming modules, e,g., the wind angle module, the airspeed module, and the SOS module).

In certain embodiments, the first radial distance and the second radial distance are the same. For example, the first receiver, the second receiver, and/or any other additional receivers can be disposed in a circle pattern around the transmitter. The first and second acoustic receivers comprise microelectro-mechanical systems (MEMS) microphones, and/or any other suitable type of acoustic receiver. The air data module can be configured to determine if an acoustic receiver is shadowed, e.g., by setting a maximum time for response, and to ignore any signals from the shadowed acoustic receivers.

A computer implemented method can include emitting an acoustic pulse using at least one acoustic transmitter receiving, at a first time, the acoustic pulse using a first acoustic receiver positioned at a radial distance from the at least one acoustic transmitter; providing a first receiver signal from the first acoustic receiver in response to receiving the acoustic pulse, receiving, at a second time, the acoustic pulse using a second acoustic receiver positioned at the radial distance from the at least one acoustic transmitter. The method can include determining a first signal delay between the first acoustic receiver and the acoustic transmitter, determining a second signal delay between the second acoustic receiver and the acoustic transmitter, determining a true airspeed (TAS) based upon the first signal delay, the second signal delay, and a wind angle, and outputting a TAS signal to an aircraft system.

The method can include determining the wind angle based on the first signal delay and the second signal delay. The method can include determining a speed of sound (SOS) based on the wing angle, the TAS, the first signal delay, and the second signal delay.

The method can include determining a Mach number based on the SOS and outputting the Mach number to an aircraft system. The method can include determining a static air temperature (SAT) based on the SOS and outputting the static air temperature to an aircraft system.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
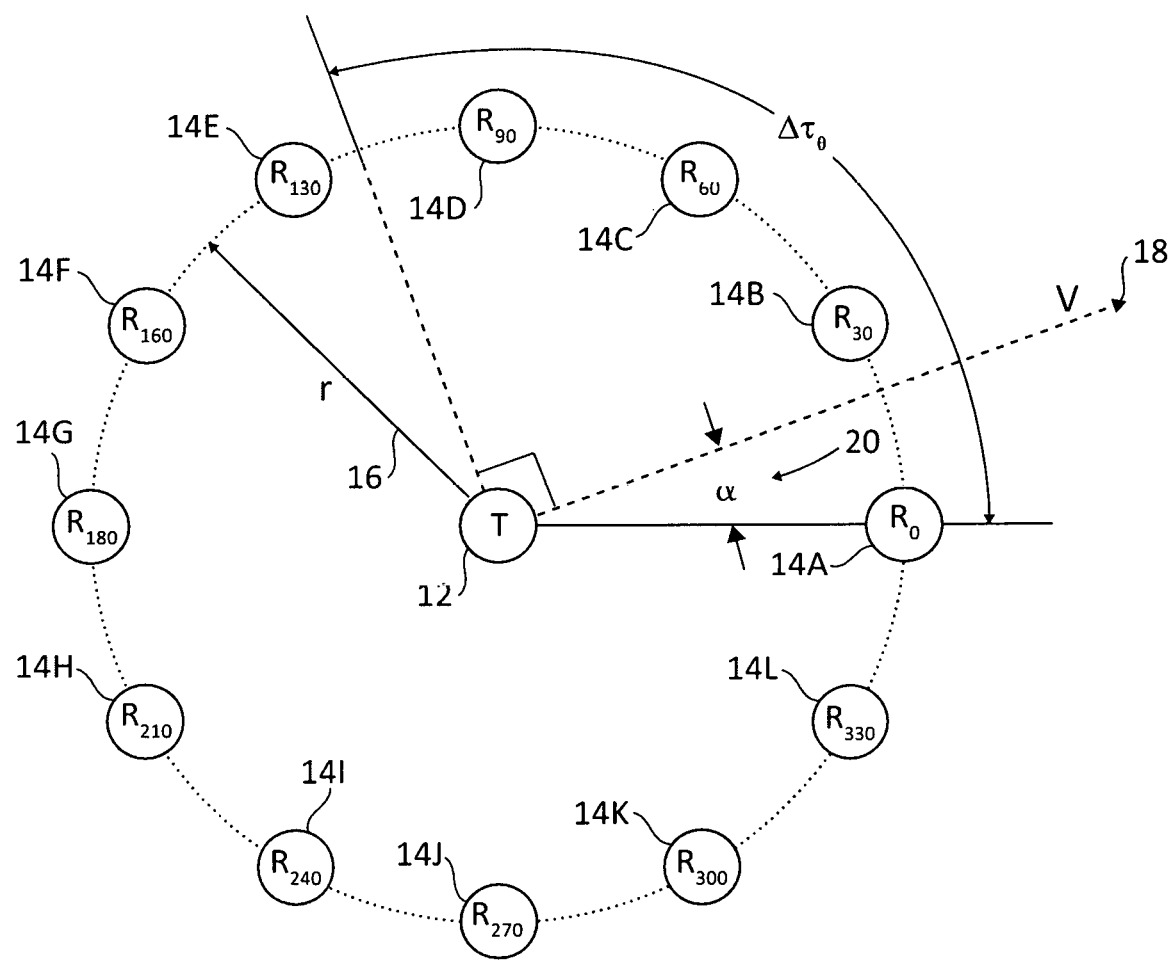
FIG. 1 is a top-down view of an air data sensor, showing an embodiment of transmitter and receiver layout.

Reference will now be made to the drawings wherein like reference numerals identify similar structural features or aspects of the subject disclosure. For purposes of explanation and illustration, and not limitation, an illustrative view of an embodiment of a sensor in accordance with the disclosure is shown in FIG. 1. Other embodiments and/or aspects of this disclosure are shown in FIGS. 2-12. The systems and methods described herein can be used to sense and determine certain air data (e.g., wind angle, airspeed).

Apparatus, systems, and associated methods relate to acoustic air data sensors. Using the apparatus, systems, and associated methods herein, allows for sensing the wind angle (e.g., angle-of-attack, angle of slip, airspeed) without mechanical moving parts or obstructing airflow. Additionally, this allows high bandwidth and update rate measurement of, e.g., wind angle and airspeed.

FIG. 1 is a top-down view of acoustic air data sensor 10 including acoustic transmitter 12, acoustic receivers 14A-14L, radius 16, airflow 18, and wind angle 20 (e.g., angle-of-attack). While certain embodiments may refer to angle-of-attack, one having ordinary skill in the art appreciates that wind angle is what is sensed, which may be angle-of-attack (AOA), angle-of-slip (AOS), or any in-between angle, depending on the local flow conditions (e.g., due to placement of a sensor and operational state of the aircraft).

With respect to determining wind angle (e.g., AOA), acoustic receivers 14A-14L can be placed at a fixed radius (r) around acoustic transmitter 12 in certain embodiments. Acoustic transmitter 12 can be a piezoelectric speaker, cone speaker, microelectro-mechanical systems (MEMS) speaker, or other electric-to-acoustic transducer. Acoustic receivers can be microphones including MEMS microphones, condenser microphones, lasers, or other acoustic-to-electric transducer.

Acoustic receivers 14A-14L can be placed at 0°, 30°, 60°, 90°, 120°, 150°, 180°, 210°, 240°, 270°, 300°, and 330° respectively, as shown. Any other suitable numbering or positioning of receivers is contemplated herein. The time-of-flight (τ) of an acoustic pulse emitted by acoustic transmitter 12 can be measured to each of acoustic receivers 14A-14L. The time-of-flight of the acoustic pulse from acoustic transmitter (T) 12 to each of acoustic receivers (R_θ) 14A-14L placed at angle θ is given by:

$$\tau_\theta = \frac{r}{C_0 + |V|\cos(\theta - \alpha)} = \qquad \text{(Equation 1)}$$

where $C_0$ is the speed of sound, $\alpha$ is angle-of-attack 20, and V is the airspeed of airflow 18.

As shown in Equation 1, time-of-flight is impacted by the airspeed and wind angle 20. The radius r is constant where acoustic receivers 14A-14L are positioned at fixed radius 16 and angle from acoustic transmitter 12. The speed of sound in air is not impacted by wind angle or airspeed. Therefore, for a known airspeed, the only variable impacting the time-of-flight of the acoustic pulse to acoustic receivers 14A-14L is wind angle 20.

Figure 2:
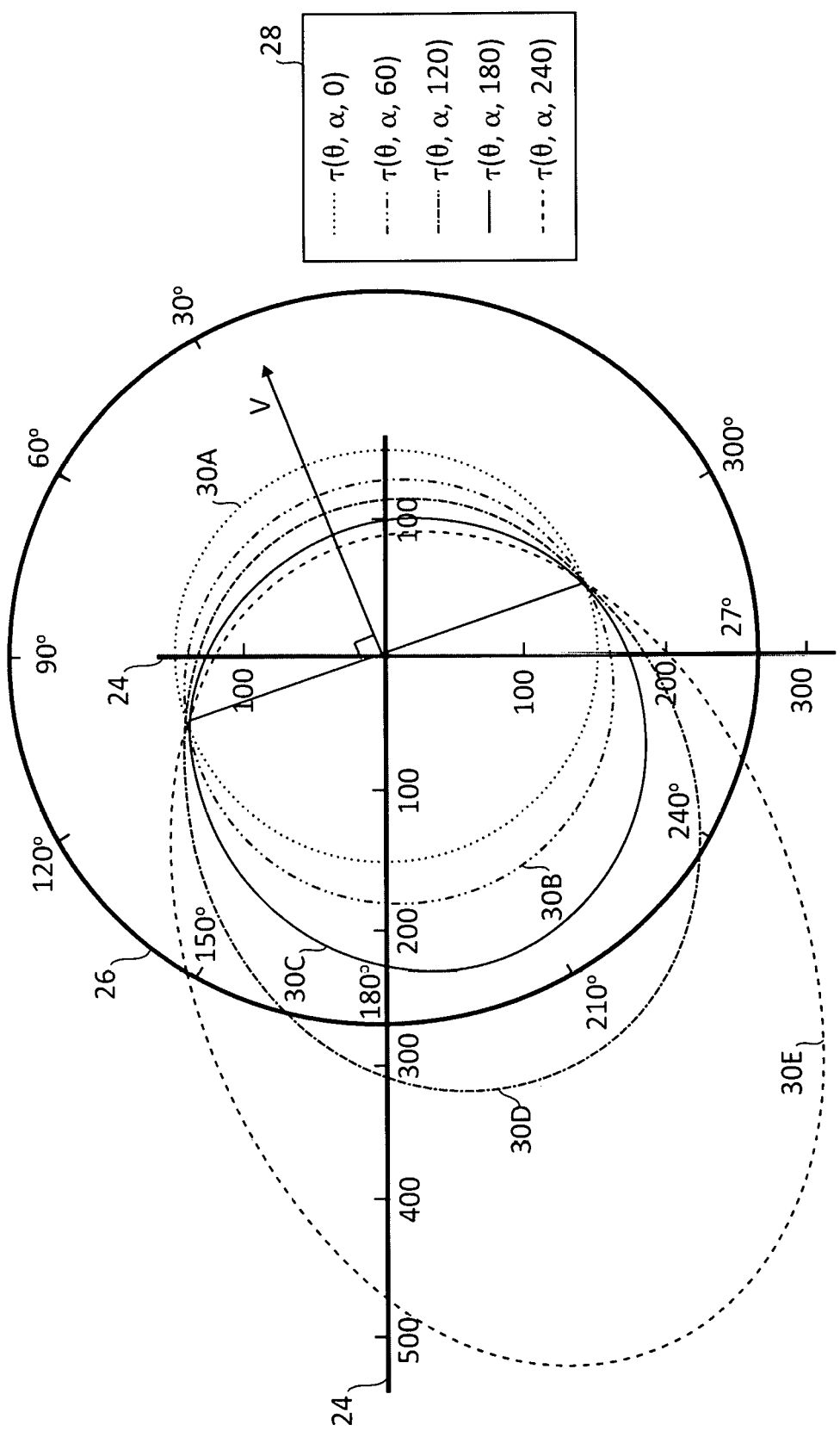
FIG. 2 is a polar plot depicting the time-of-flight between an acoustic transmitter and an acoustic receiver at various air speeds (V=0, 60, 120, 180, and 240 as shown).

FIG. 2 shows polar plot 22 including radial axis 24, angular axis 26, legend 28, and ellipses 30A-30E. For purposes of clarity and ease of discussion, FIG. 2 is described below within the context of acoustic air data sensor 10 of FIG. 1.

Radial axis 24 indicates the time in micro-seconds. Angular axis 26 indicates the angle in degrees. Legend 28 matches each of ellipses 30A-30E to an airspeed. Ellipses 30A-30E represent the time it takes (time-of-flight) for a pulse to travel from acoustic transmitter 12 to radius 16 based upon angle-of-attack 20 and a given airspeed. Ellipses 30A-30E represent the time-of-flight at airspeeds of 0 meters per second (m/s), 60 m/s, 120 m/s, 180 m/s, and 240 m/s respectively. Ellipses 30A-30E can be derived using Equation 1 with an angle-of-attack of 20°, a radius of 0.05 meters, and a speed of sound of 331.45 m/s.

As shown in FIG. 2, air speed impacts the time-of-flight of the acoustic pulse at all angles except those angles 90° from the wind angle 20. Ellipses 30A-30E have the same time-of-flight at 110° and 290°. At 90° from angle-of-attack 20, the velocity term of Equation 1 is zero. This means that the speed of sound at an angle that is 90° from wind angle 20 can be determined from:

$$C_0 = \frac{r}{\tau_{\theta_0}}.$$ (Equation 2)

Figure 3:
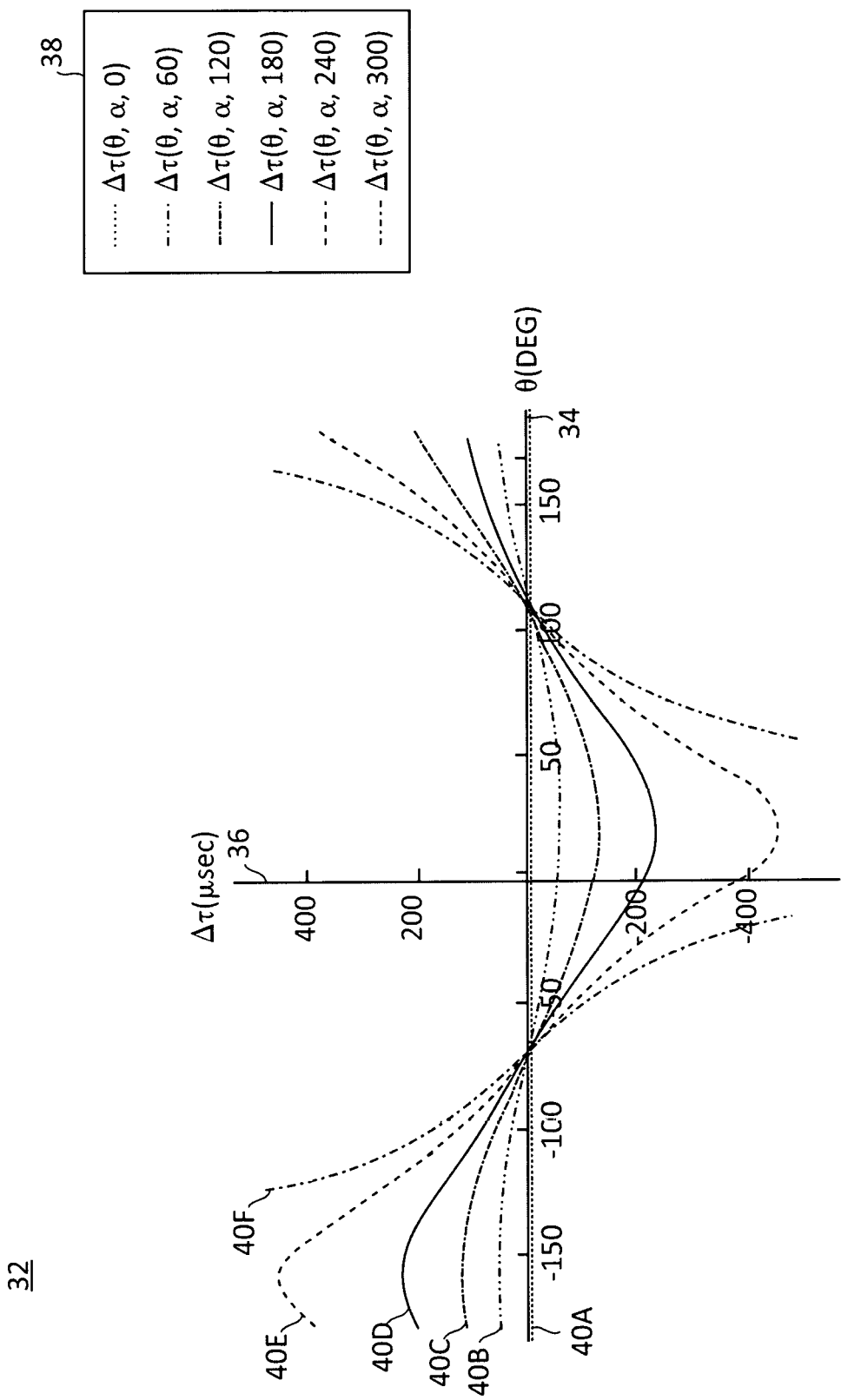
FIG. 3 is a graph depicting the time-of-flight difference between opposing acoustic receivers.

FIG. 3 is graph 32 depicting including x-axis 34, y-axis 36, legend 38, and curves 40A-40F. Graph 32 depicts the difference in time-of-flight (Δ) between opposing acoustic receivers R6 and R6+180° given by:

$$\Delta\tau_\theta = \tau_\theta - \tau_{\theta+180°},$$ (Equation 3)

with an angle-of-attack of 20° and a radius of 0.05 meters. X-axis 34 depicts the difference in time-of-flight in microseconds. Y-axis 36 depicts the angle in degrees. Legend 38 matches each of curves 40A-40F to a given airspeed. Curves 40A-40F represent the difference in time-of-flight of opposing acoustic receivers at airspeeds of 0 m/s, 60 m/s, 120 m/s, 180 m/s, 240 m/s, and 300 m/s respectively. The zero-crossing of each of curves 40A-40F occurs at 90° from the angle-of-attack. Curves 40A-40F can be represented by polynomials. The polynomials will equal zero at 90° from the angle of attack.

Figure 4:
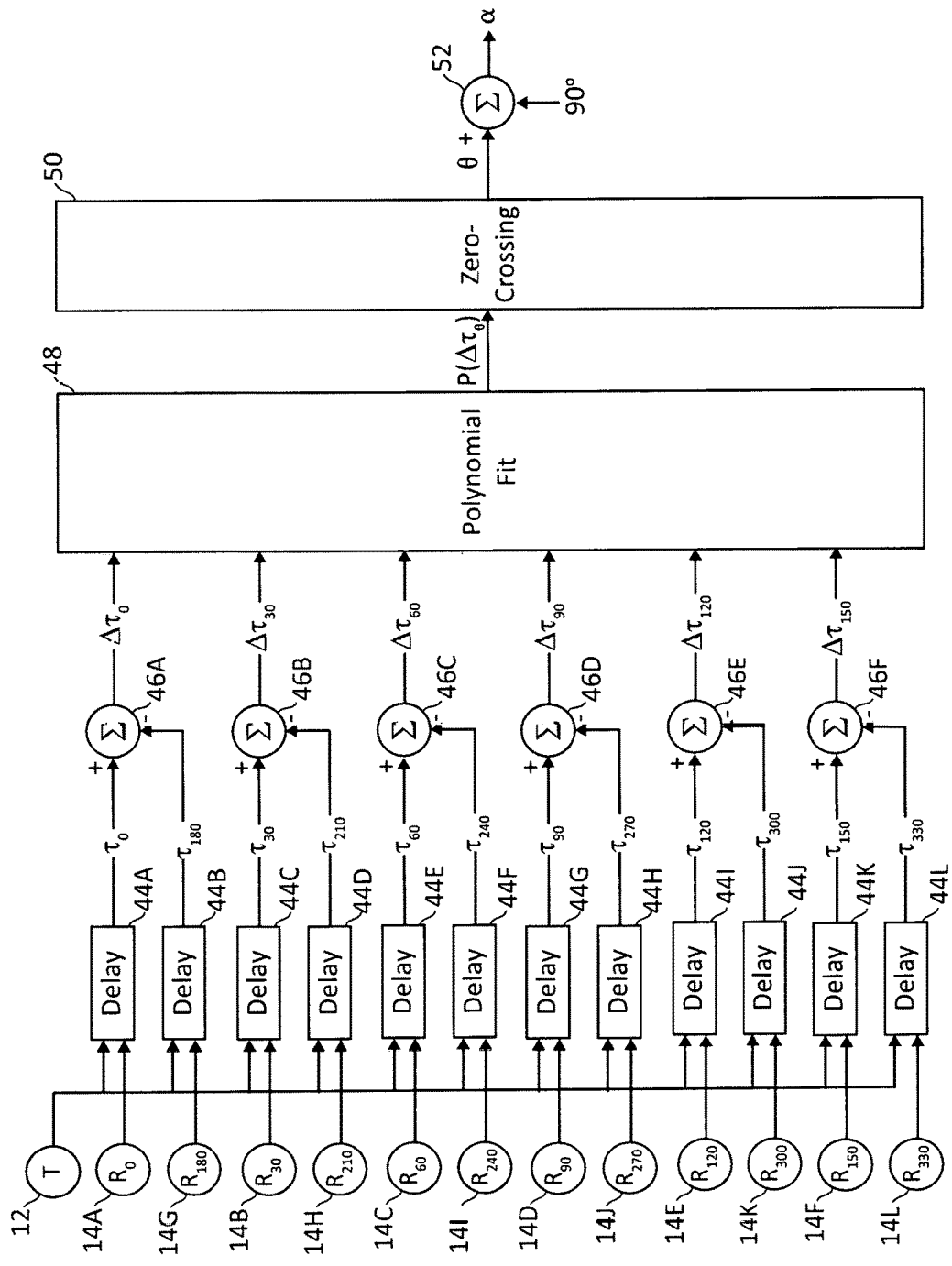
FIG. 4 is a system and software block diagram for a first example of an acoustic air data sensor.

FIG. 4 shows system diagram 42 for an embodiment of an acoustic wind angle sensor 10 (e.g., AOA sensor) of FIG. 1 including acoustic transmitter 12, acoustic receivers 14A-14L, delay circuitry 44A-44L, difference circuitry 46A-46F, polynomial fit circuitry 48, zero-crossing circuitry 50, and subtraction circuitry 52.

Acoustic transmitter 12 can provide an electrical signal to delay circuitry 44A-44L representing the waveform of a transmitted acoustic pulse. Acoustic receivers 14A-14L can provide signals to delay circuitry 44A-44L representing the waveform of the acoustic pulse received from acoustic transmitter 12. Delay circuitry 44A-44L can extract the delay between the transmitted and received waveforms and provide the extracted delays to difference circuitry 46A-46F. Each of difference circuitry 46A-46F can receive the extracted delays of a pair of opposing (180° apart) acoustic receivers. Difference circuitry 46A-46F can determine the difference in time-of-flight (Δθ) between each pair of opposing acoustic receivers and provide the differences to polynomial fit circuitry 48. For clarity, FIG. 4 shows the relative timing of the transmitted and received signals with the delays (θ) and delay differences (Δθ) overlaid.

Polynomial fit circuitry 48 can receive the time-of-flight differences from difference circuitry 46A-46F. Each time-of-flight difference represents two points, one on either side of zero, because the difference is associated with two acoustic receivers 180° apart. In certain embodiments, polynomial fit circuitry 48 determines the best least-squares polynomial fit about the two points. In another example, polynomial fit circuitry 48 determines the polynomial based upon known curves. Acoustic receivers 14A-14L can be positioned at known angles (Rθ) and known radius 16. Since the variables, except for wind angle and airspeed, for determining the delays and therefore the delay differences are known, the delay difference curves are well established. This can be pictured using curves 40A-40F of FIG. 3 since they depict the difference in time-of-flight (Δ) between opposing acoustic receivers R6 and R6+180° given by Equation 3. Polynomial fit circuitry 48 provides the polynomial (PΔτθ). Zero-crossing circuitry 50 receives the polynomial from polynomial fit circuitry 48. Zero-crossing circuitry 50 determines the angle where the polynomial crosses zero. Zero-crossing circuitry 50 provides the angle where the polynomial crosses zero to subtraction circuitry 52. Subtraction circuitry 52 receives the angle from zero-crossing circuitry 50. Subtraction circuitry 52 determines the wind angle (α) by subtracting 90° from the angle provided by zero-crossing circuitry 50. Delay circuitry 44A-44L, difference circuitry 46A-46F, polynomial fit circuitry 48, zero-crossing circuitry 50, and subtraction circuitry 52 as described herein, can be implemented in hardware and/or software.

Figure 5:
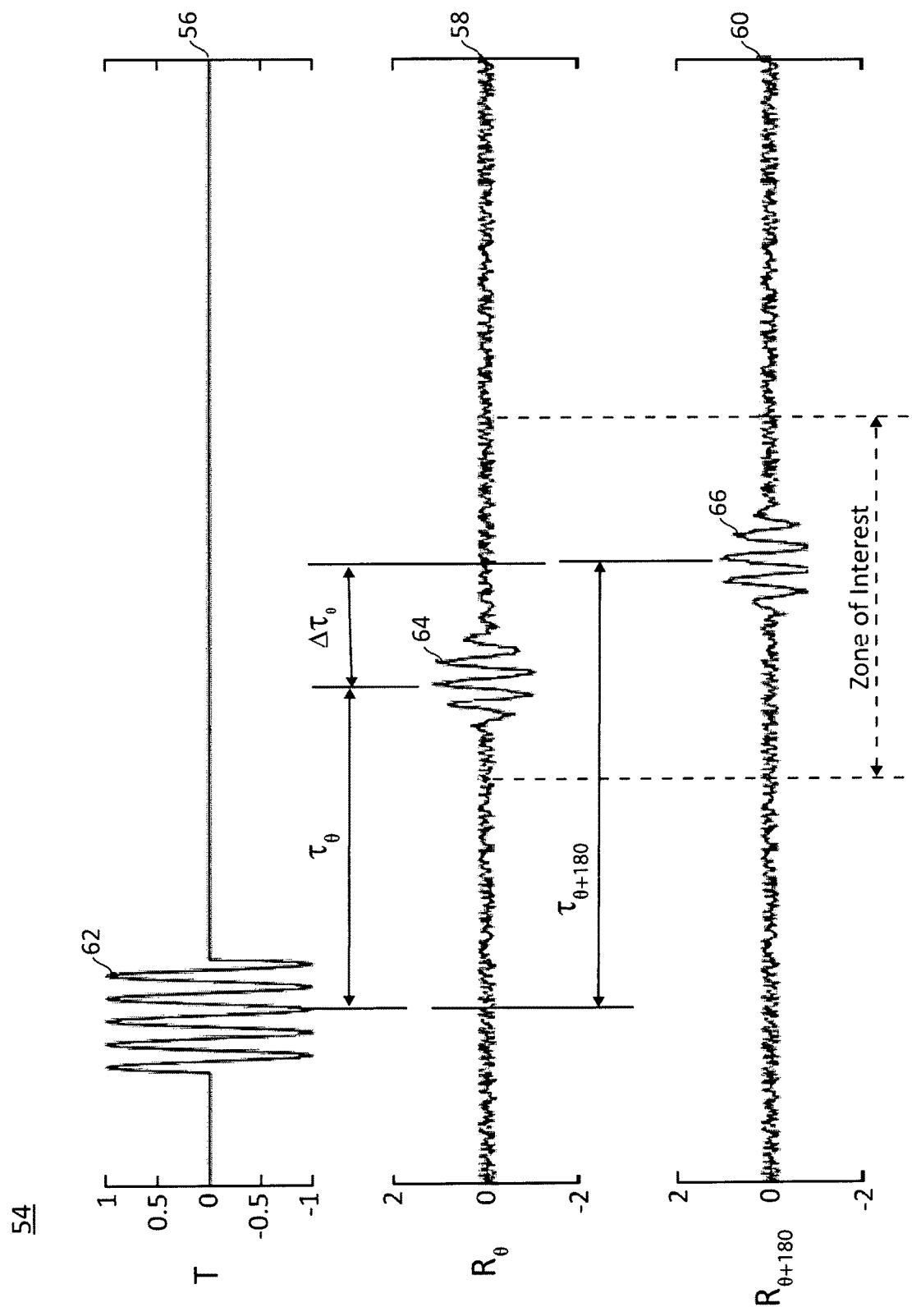
FIG. 5 is a pulse timing diagram of an acoustic air data sensor.

FIG. 5 is pulse timing diagram 54 including acoustic transmitter waveform 56, acoustic receiver waveform 58, and opposing acoustic receiver waveform 60. Acoustic transmitter waveform 62 can include acoustic transmitter pulse 62. Acoustic receiver waveform 58 can include acoustic receiver pulse 64. Opposing acoustic receiver waveform 60 can include opposing acoustic receiver pulse 66.

Acoustic transmitter pulse 62 represents the acoustic pulse emitted by acoustic transmitter of an acoustic angle-of-attack sensor. Acoustic receiver pulse 64 represents the acoustic pulse sensed by a first acoustic receiver. Opposing acoustic receiver pulse 66 represents the acoustic pulse sensed by a second acoustic receiver, 180° from the first acoustic receiver, or opposing the first acoustic receiver. The timing diagram shows the time between the transmission of an acoustic pulse from the acoustic transmitter and the time the acoustic pulse is sensed by each of the first and second acoustic receivers. The zone-of-interest represents a time period that acoustic receiver pulse 64 and opposing acoustic receiver pulse 66 are received in.

Figure 6:
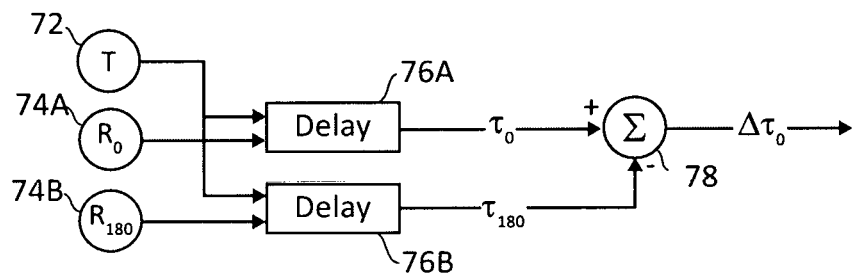
FIG. 6 depicts equivalent subsystems of an acoustic air data sensor.
Figure 6:
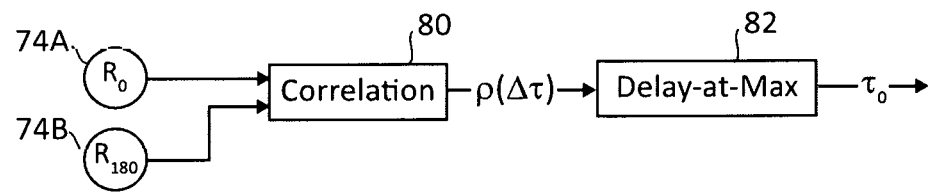

FIG. 6 depicts subsystems of two different embodiments of an acoustic air data sensor, including delay subsystem 68 and cross-correlation subsystem 70. Delay subsystem 68 includes acoustic transmitter 72, acoustic receivers 74A and 74B, delay circuitry 76A and 76B, and difference circuitry 78. Cross-correlation subsystem 70 includes acoustic receivers 74A and 74B, cross-correlation circuitry 80, and max delay circuitry 82.

Delay subsystem 68 and cross-correlation subsystem 70 can be used interchangeably in an acoustic wind angle sensor. Delay subsystem 68 represents a subsystem the acoustic angle-of-attack sensor system of system diagram 42 of FIG. 4. Acoustic transmitter 72 is representative of acoustic transmitter 12, acoustic receivers 74A and 74B are representative of acoustic receivers 14A and 14G, delay circuitry 76A and 76B are representative of delay circuitry 16A and 16B, and difference circuitry 78 is representative of difference circuitry 18A. Delay subsystem 68 uses delay circuitry 76A and 76B to determine the individual delays between the emission of an acoustic pulse by acoustic transmitter 72 and the reception of the acoustic pulse by acoustic receivers 74A and 74B. Difference circuitry 78 determines the delay difference (τθ) between acoustic receivers 74A and 74B based upon the individual delays.

In contrast, cross-correlation subsystem 70 uses cross-correlation circuitry 80 to produce a correlation signal (ρ)

using signals provided by acoustic receivers 74A and 74B. The correlation signal represents a cross-correlation function of the signals provided by the acoustic receivers. Cross-correlation functions indicate how alike two signals are based upon shifting one of the signals a given amount in time. As shown in Max delay circuitry 82 can determine a peak correlation of the correlation signal which corresponds to the delay difference (τθ). This can be seen in FIG. 5, that shifting opposing receiver waveform 60 left on the time axis a time equal to the delay difference would cause acoustic receiver pulse 64 and opposing acoustic receiver pulse 66 to align causing the greatest correlation between the two signals. Correlation circuitry 80 and max delay circuitry 82 can be used in place of delay circuitry 76A and 76B and difference circuitry 78, for example.

Figure 7:
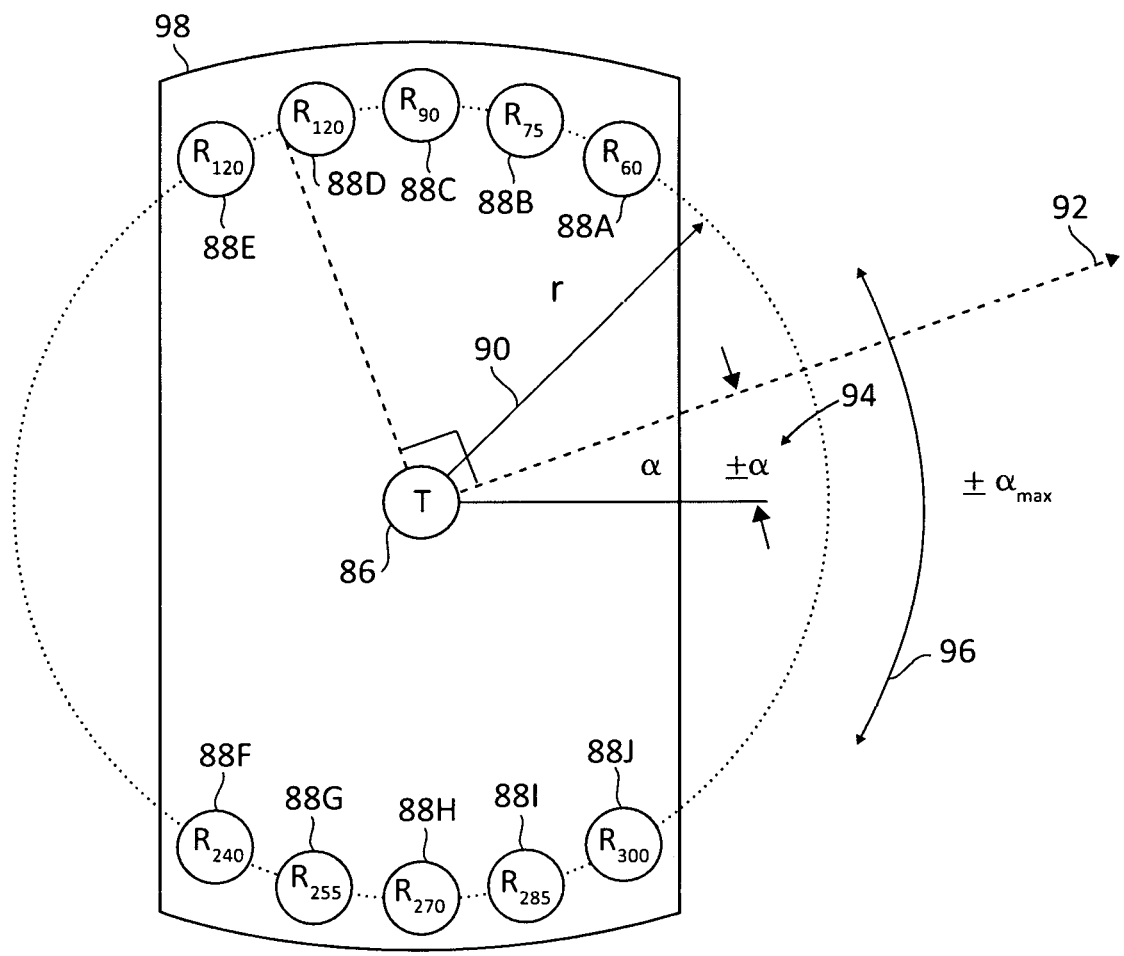
FIG. 7 is a top-down view of an acoustic air data sensor with unrestricted airflow.

FIG. 7 is a top-down view of one example of acoustic air data sensor 84 that can be used when the wind angle for a given use has a known limited range. In this example, wind angle limit 96 is ±30°. Acoustic angle-of-attack sensor 84 includes acoustic transmitter 86, acoustic receivers 88A-88J, radius 90, airflow 92, angle-of-attack 94, angle-of-attack limit 96, and mounting plate 98.

Acoustic receivers 88A-88J are positioned along radius 90 orthogonal to wind angle limit 96. Such embodiments allow the use of fewer acoustic receivers and/or more densely populated acoustic receivers without increasing the amount of acoustic receivers. As shown, acoustic transmitter 86 and acoustic receivers 88A-88J can be disposed on mounting plate 98. This can allow for simple installation and replacement of acoustic angle-of-attack sensor 84 as the whole sensor can be removed and replaced at once, rather than being embedded in, for example, an aircraft fuselage. In certain embodiments, acoustic transmitter 86 is an ultrasonic transmitter. An ultrasonic transmitter would not be heard by passengers. In certain embodiments, acoustic receivers 88A-88J can include a high pass filter to filter out audible noise. As shown, airflow 92 can be unobstructed across acoustic air data sensor 84, thus reducing airflow disturbance and drag.

Figure 8:
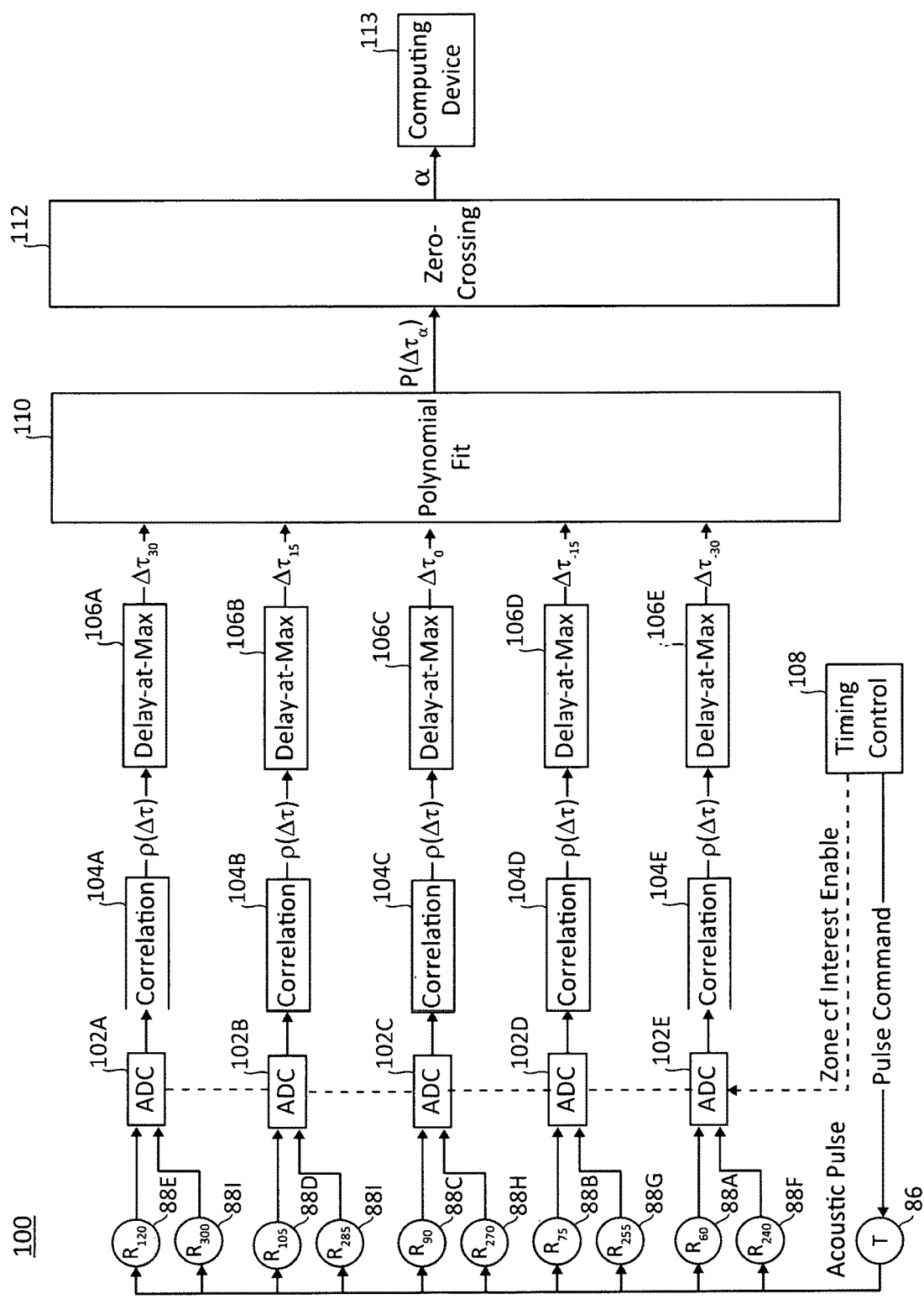
FIG. 8 is a system and software block diagram for a second example of an acoustic air data sensor.

FIG. 8 is system diagram 100 including acoustic transmitter 86, acoustic receivers 88A-88J, analog-to-digital converters 102A-102E, cross-correlation circuitry 104A-104E, max delay circuitry 106A-106E, timing control circuitry 108, polynomial fit circuitry 110, zero-crossing circuitry 112, and computing device 113. For purposes of clarity and ease of discussion, system diagram 100 is discussed within the context of acoustic air data sensor 84 of FIG. 7.

Timing control circuitry 108 is configured to provide a pulse command to acoustic transmitter 86. Acoustic transmitter 86 can be configured to emit an acoustic pulse in response to receiving the pulse command. Acoustic receivers 88A-88E can receive the acoustic pulse after a time delay that is impacted by airspeed 92 as indicated by Equation 1. Acoustic receivers 88A-88E provide receiver signals to analog-to-digital converters 102A-102E. Analog-to-digital converters 102A-102E can convert the receiver signals to digital waveforms. Analog-to-digital converters 102A-102E can provide the digital waveforms to cross-correlation circuitry 104A-104E. Cross-correlation circuitry 104A-104E receives the digital waveforms. Cross-correlation circuitry 104A-104E determines correlation signals (ρ) using the digital waveforms. The correlation signal represents a cross-correlation function of the signals provided by the acoustic receivers. Cross-correlation functions indicate how alike two signals are based upon shifting one of the signals a given amount in time. Cross-correlation circuitry 104A-104E provides the correlation signals to max delay circuitry 106A-106D. Max delay circuitry 106A-106D receives the cross-correlation signals. Max delay circuitry 106A-106D determines the peak correlations of the correlation signals. The peak correlations correspond to the delay differences (τθ) of acoustic receivers 88A-88J. Max delay circuitry 106A-106D provides the delay differences to polynomial fit circuitry 110.

Polynomial fit circuitry 110 receives the time-of-flight differences from max delay circuitry 106A-106D. Each time-of-flight difference represents two points, one on either side of zero, because the difference is associated with two acoustic receivers 180° apart. In one example, polynomial fit circuitry 110 determines the best least-squares polynomial fit about the two points. In another example, polynomial fit circuitry 48 determines the polynomial based upon known curves. Acoustic receivers 88A-88E are positioned at known angles (Rθ) and known radius 90. Since the variables, except for angle-of-attack and airspeed, for determining the delays and therefore the delay differences are known, the delay difference curves are well established. Polynomial fit circuitry 110 provides the polynomial (PΔτθ). Zero-crossing circuitry 112 receives the polynomial from polynomial fit circuitry 110. Zero-crossing circuitry 112 determines the angle (α) where the polynomial crosses zero. Zero-crossing circuitry 112 provides the angle where the polynomial crosses zero to computing device 113. Computing device can be an aircraft controller, engine controller, or other computing device. Analog-to-digital converters 102A-102E, cross-correlation circuitry 104A-104E, max delay circuitry 106A-106E, timing control circuitry 108, polynomial fit circuitry 110, zero-crossing circuitry 112, and computing device 113 as described herein, can be implemented in hardware and/or software such as a processor executing instructions of computer-readable memory.

Figure 9:
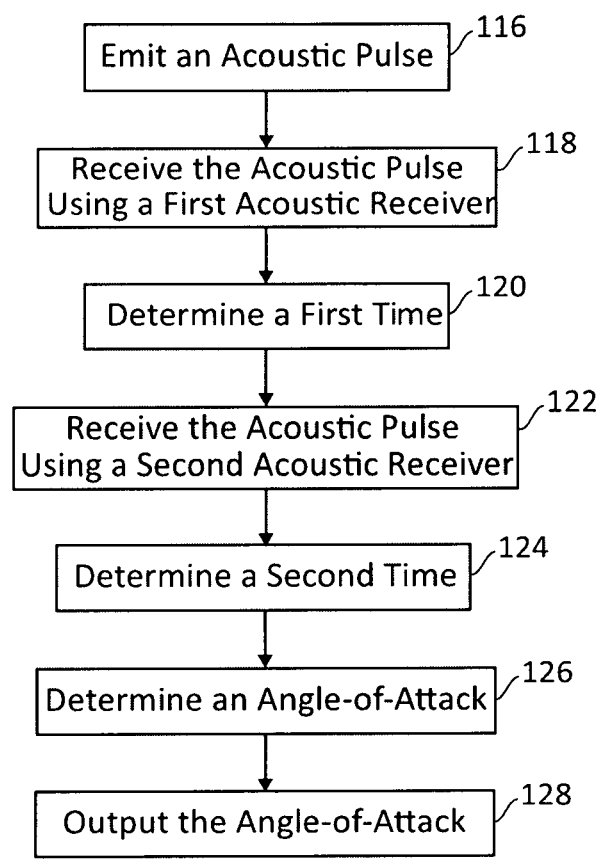
FIG. 9 is a flow chart of an acoustic angle-of-attack process.

FIG. 9 is a flow chart of an embodiment of an acoustic wind angle sensing process 114. For purposes of clarity and ease of discussion, wind angle sensing process 114 is discussed in the context of system diagram 100 of FIG. 8. At step 116, an acoustic pulse can be emitted by acoustic transmitter 86. In one example, the acoustic pulse is emitted by acoustic transmitter 86 in response to receiving a pulse command from time control circuitry 108. At step 118, the acoustic pulse can be received by acoustic receiver 88A. At step 120, acoustic receiver 88A can provide a receiver signal in response to receiving the acoustic pulse. At step, 122, acoustic receiver 88F can receive the acoustic pulse. At step 124, acoustic receiver 88F can provides receiver signal in response to receiving the acoustic pulse. At step 126, a delay difference between the first and second receiver signals can be determined. In some examples, the delay difference can be determined using delay circuitry 44A and difference circuitry 46A of FIG. 4. In other examples, the delay difference can be determined using cross-correlation circuitry 104E and max delay circuitry 106E. At step 128, a wind angle (e.g., AOA) is determined based upon the delay difference. In some examples, the delay difference can be used to determine a polynomial using polynomial fit circuitry 110. Zero-crossing circuitry 112 can determine the angle that the polynomial equals zero to determine the wind angle. At step 130, the wind angle can be provided to computing device 113. In certain embodiments, the computing device 113 can be an aircraft computer or any other suitable device.

Accordingly, implementing certain techniques of this disclosure, acoustic air data sensors can be used accurately determine wind angle without obstructing airflow or using mechanical moving parts. Using acoustic air data sensors as described herein, provides a high bandwidth and update rate measurement of angle-of-attack without placing sensor components directly into airflow. This lowers the icing risks of the angle-of-attack sensor and reduces airflow disturbance and drag.

In accordance with at least one aspect of this disclosure, it is contemplated that one or more embodiments of an air data sensor can be used to determine airspeed and/or other air data parameters.

Figure 10:
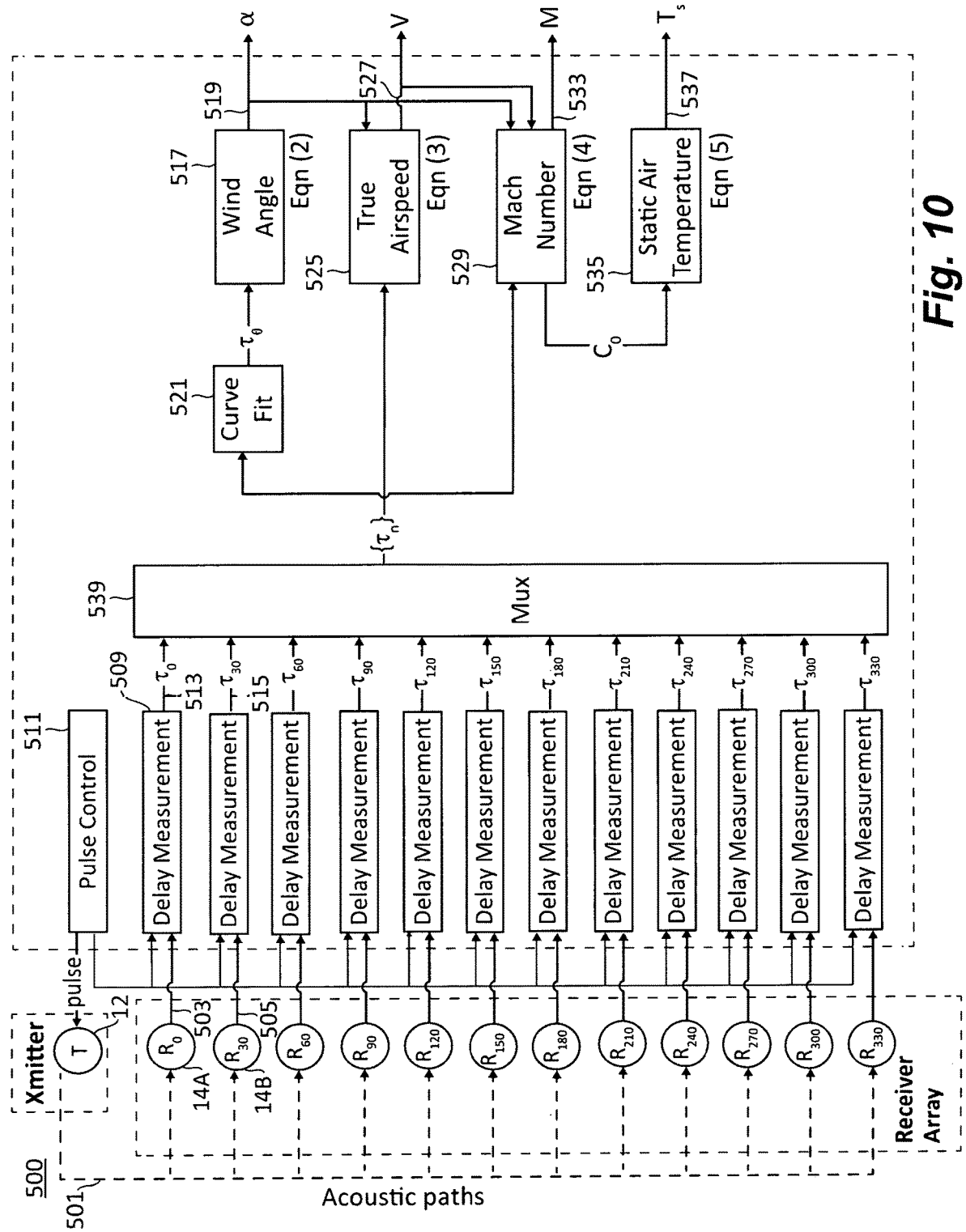
FIG. 10 is a schematic diagram of an embodiment of a sensor or sensor system in accordance with this disclosure.

For example, referring to FIG. 10, an acoustic airspeed sensor system 500 can include at least one acoustic transmitter 12 (T) configured to provide an acoustic pulse and a plurality of acoustic receivers, e.g., 14A-14K as shown in FIG. 1. The one or more receivers can include at least a first acoustic receiver (e.g., 14A) positioned at a first radial distance (e.g., downstream in operation) from the at least one acoustic transmitter 12 and a second acoustic receiver (e.g., 14B) positioned at a second radial distance (e.g., downstream in operation) from the at least one acoustic transmitter 12.

The first acoustic receiver can be configured to receive the acoustic pulse 501 at a first time and output a first receiver signal 503. The second acoustic receiver is configured to receive the acoustic pulse 501 at a second time and output a second receiver signal 505. The sensor system 500 can include an air data module 507 operatively connected to the first acoustic receiver and the second acoustic receiver. The air data module 507 is configured to receive the first receiver signal 503 and the second receiver signal 505, determine a first signal delay between receiving the first receiver signal and transmission of the acoustic pulse 501 by the acoustic transmitter 12 and determine a second signal delay between receiving the second receiver signal and transmission of the acoustic pulse 501 by the acoustic transmitter 12.

The air data module 507 can be configured to receive or determine a wind angle. For example, the air data module 507 can include any suitable circuitry as described above to determine wind angle (e.g., AOA). The air data module 507 can be configured to determine true air speed (TAS) based upon the first signal delay, the second signal delay, and the wind angle, and output a TAS signal indicative of the TAS.

In certain embodiments, the air data module 507 can include one or more delay measurement modules 509 (e.g., which can be similar to delay circuitry as described above) operatively connected to a pulse control module 511 and the first and/or second acoustic receiver. As shown, each receiver can include a dedicated delay measurement module 509. Any other suitable number of delay measurement modules 509 are contemplated herein. The pulse control module 511 can be operatively connected to the transmitter 12 and configured to cause the transmitter 12 to send the acoustic pulse 501 at a send time. The one or more delay measurement modules 509 can be configured to compare the send time and the first time to determine the first signal delay and output first delay data 513 indicative thereof. The one or more delay measurement modules 509 can be configured to compare the send time to the second time to determine the second signal delay and output second delay data 515.

The air data module 507 can include a wind angle module 517 operatively connected to the one or more delay measurement modules 509 to receive the first delay data 513 and the second delay data 515. The wind angle module 517 can be configured to determine the wind angle based on the first delay data 513 and the second delay data 515 and to output wind angle data 519 (e.g., to an aircraft computer and/or other module). The air data module can include a curve fit module 521 configured to curve fit the first delay data 513 and the second delay data 515 and to output curve fit data 523 to the wind angle module 517.

The air data module 507 can include an airspeed module 525 operatively connected to the wind angle module 517 to receive wind angle data 519 therefrom. The airspeed module 525 can be operatively connected to the one or more delay measurement modules 509 to receive the first delay data 513 and the second delay data 515. The airspeed module 525 can be configured to determine TAS based on the wind angle data 519, the first delay data 513, and the second delay data 515, and to output the TAS signal 527 (e.g., to an aircraft computer and/or other module).

The air data module 507 can include a speed of sound (SOS) module 529 operatively connected to the airspeed module 525 to receive the TAS signal 527. The SOS module 529 can be operatively connected to the one or more delay measurement modules 509 to receive the first delay data 513 and the second delay data 515. The SOS module 529 can be operatively connected to the one or more delay measurement modules 509 to receive the first delay data 513 and the second delay data 515. The SOS module 529 can be operatively connected to the wind angle module 517 to receive wind angle data 519. The SOS module 517 can be configured to determine a SOS based on the TAS signal 527, the first and second delay data 513, 515, and to output SOS data 531 (e.g., to an aircraft computer and/or other module).

The SOS module 529 can be configured to determine Mach number from the SOS and to output a Mach number signal 533 (e.g., to an aircraft computer and/or other module). The air data module 507 can include a static air temperature module 535 operatively connected to the SOS module to receive the SOS data 531 to determine a static air temperature (SAT) based on the SOS data 531, and to output a SAT signal 537 (e.g., to an aircraft computer and/or other module).

In certain embodiments, the air data module 507 can include a multiplexer (MUX) 539 between the one or more delay measurement modules 509 and at least one other module of the air data module 507. The MUX 539 can be configured to receive the first delay data 513 and the second delay data 515 from the one or more delay measurement modules and to multiplex the data (e.g., for output to consuming modules, e,g., the wind angle module, the airspeed module, and the SOS module).

As described above, in certain embodiments, the first radial distance and the second radial distance of the receivers 14A-14K can be the same. However, it is contemplated that varying radial distance can be used for determining certain air data parameters (e.g., airspeed). For example, the first receiver (e.g., 14A), the second receiver (e.g., 14B), and/or any other additional receivers (e.g., 14C-14K) can be disposed in a circle pattern around the transmitter 12.

In certain embodiments, the pattern need not be circular. For example, the radial distance from transmitter to all receivers need not be a fixed distance. Each receiver can be placed at a different, known radial distance. Then all the transit delays measured can be normalized to an arbitrary fixed reference distance. As a non-limiting example, if a first receiver is at 1 cm and a second receiver is at 4 cm then both can be normalized to a fixed reference distance of, e.g., 2 cm. In this example, the first receiver's measured delay would be doubled (delay=2 cm/1 cm) and the second receiver's measured delay would be halved (delay=2 cm/4 cm). Such new delay numbers are effectively what would have been measured if the receivers were all positioned at 2 cm. This is one way to allow for non-circular patterns for the receivers. The receiver still spans multiple angles. Any other suitable embodiment to allow for non-circular receivers is contemplated herein.

In certain embodiments, one or more of the receivers (e.g., 14A-14K) can include microelectro-mechanical systems (MEMS) microphones. Any other suitable type of acoustic receiver is contemplated herein.

Figure 11:
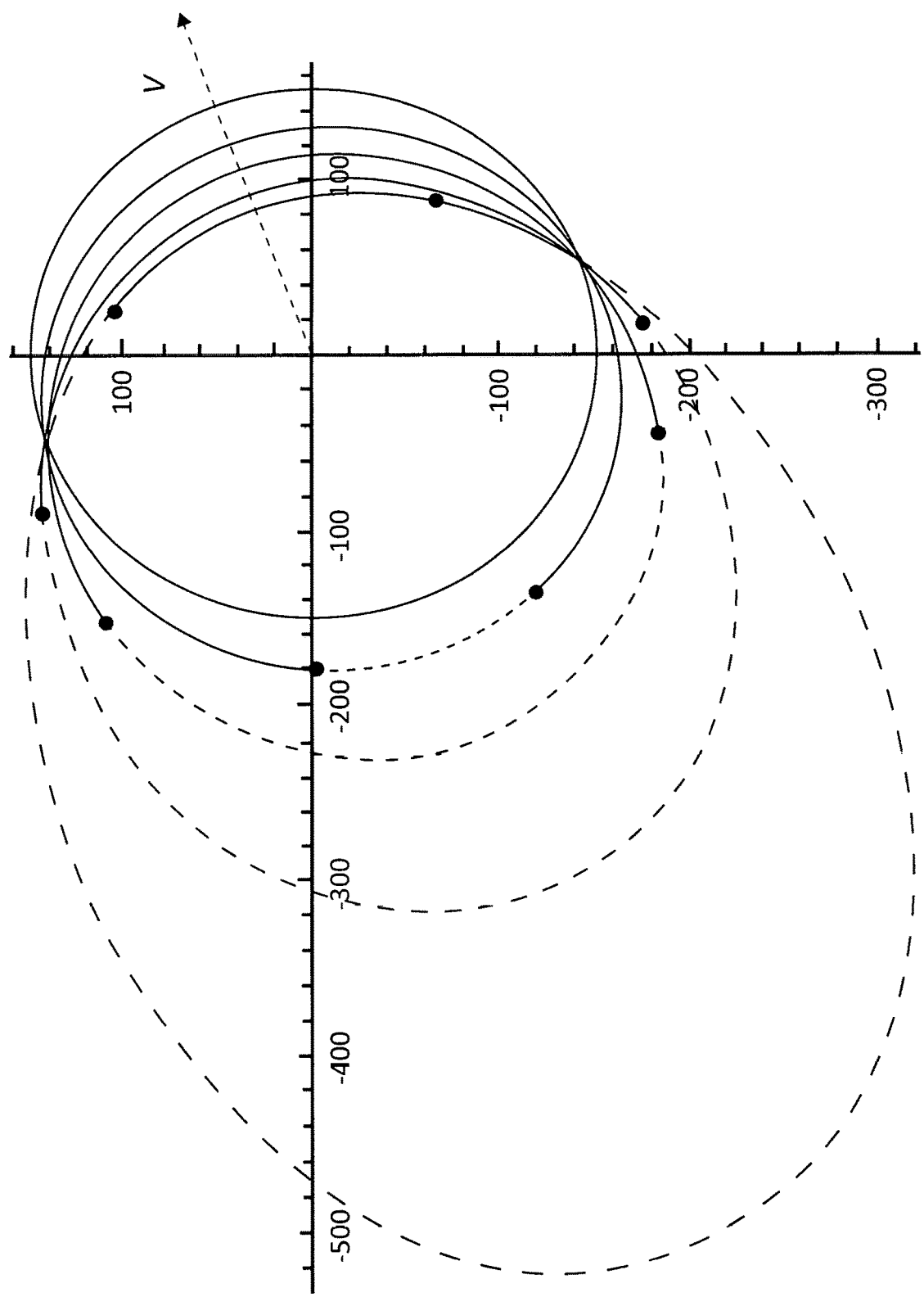
FIG. 11 is a polar plot depicting the time-of-flight between an acoustic transmitter and an acoustic receiver at various air speeds (V=0, 60, 120, 180, and 240 as shown), showing the shadowing effect due to velocity.

Referring additionally to FIG. 11, certain receivers may be shadowed under certain operating conditions (e.g., as a function of wind angles and airspeed). Dotted line regions show, with respect to the above described polar chart, where receivers of certain positions will be shadowed as a result of wind angle and airspeed. In selecting the number of receivers and positions thereof, it is contemplated that embodiments where only receivers that are not shadowed under all operating conditions can be used in a sensor, instead of a full circle of receivers (e.g., as shown in the embodiment of FIG. 7).

In certain embodiments, the air data module 507 can be configured to determine if an acoustic receiver is shadowed, e.g., by setting a maximum time for response. The air data module 507 can ignore any signals from the shadowed acoustic receivers so that false data or noise is not considered in determining air data parameters (e.g., wind angle and airspeed).

Figure 12:
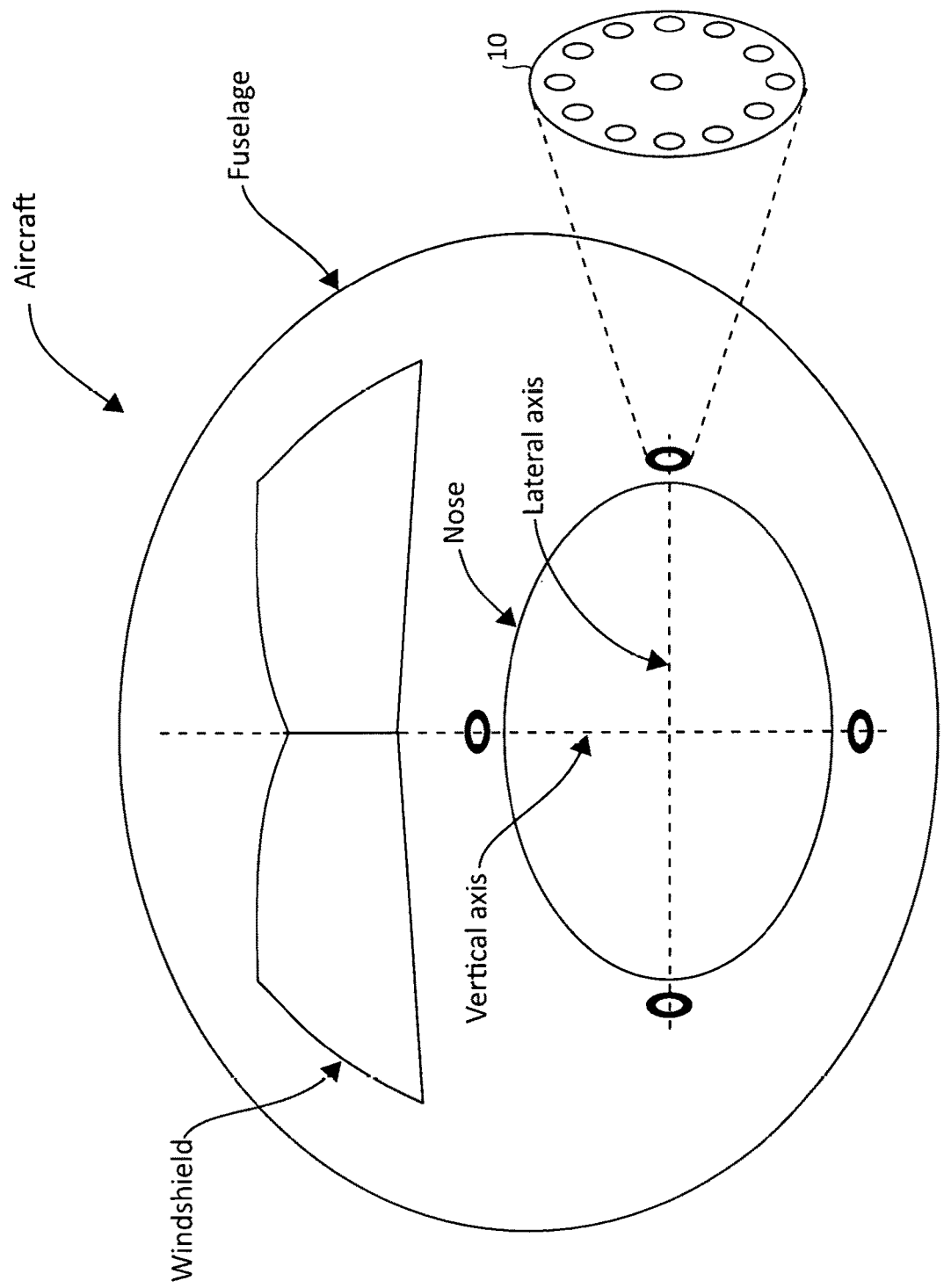
FIG. 12 is a schematic diagram of an embodiment of placement of one or more sensors on an aircraft.

Referring additionally to FIG. 12, an embodiment of placement of one or more sensors is shown. As shown, in certain embodiments, the one or more sensors can be placed on a side of an aircraft (e.g., where pitot static tubes are, mounted so airflow stays attached to the fuselage and/or where flow over will not be blocked). As shown, multiple sensor locations can be utilized to determine both AOA and AOS.

In embodiments of airspeed systems disclosed herein, the transmitter is upstream of all receivers used to determine, e.g., airspeed. This is not the case with traditionally acoustic sensors and allows operation in airspeeds above about Mach 0.2.

A computer implemented method can include emitting an acoustic pulse using at least one acoustic transmitter receiving, at a first time, the acoustic pulse using a first acoustic receiver positioned at a radial distance from the at least one acoustic transmitter; providing a first receiver signal from the first acoustic receiver in response to receiving the acoustic pulse, receiving, at a second time, the acoustic pulse using a second acoustic receiver positioned at the radial distance from the at least one acoustic transmitter. The method can include determining a first signal delay between the first acoustic receiver and the acoustic transmitter, determining a second signal delay between the second acoustic receiver and the acoustic transmitter, determining a true airspeed (TAS) based upon the first signal delay, the second signal delay, and a wind angle, and outputting a TAS signal to an aircraft system.

The method can include determining the wind angle based on the first signal delay and the second signal delay. The method can include determining a speed of sound (SOS) based on the wing angle, the TAS, the first signal delay, and the second signal delay.

The method can include determining a Mach number based on the SOS and outputting the Mach number to an aircraft system. The method can include determining a static air temperature (SAT) based on the SOS and outputting the static air temperature to an aircraft system.

Disclosed is an ultrasonic acoustic system that directly measures air-craft airspeed and relative wind angle (e.g., angle of attack or sideslip). This design has no pitot probe or moving mechanical parts such as is typical for traditional pressure-based airdata systems and wind vane sensor designs. By measuring the acoustic time-of-flight and signal strength of an acoustic pulse at a span of angles and distances across a flush surface, this information can be used to construct aircraft airspeed and wind angle By placing a ring of ultrasonic receivers (microphones) at a fixed radius r around a transmitter as shown in FIG. 1 the time-of-flight of an acoustic pulse can be measured to each receiver.

The time-of-flight $\tau$ of an acoustic pulse from the transmitter T to a receiver $R_\theta$ placed at angle $\theta$ is given by:

$$\tau_\theta = \frac{r}{C_0 + V\cos(\alpha - \theta)}, V \geq 0, \text{ and } C_0 \geq 0$$

where $C_0$ is the speed of sound, V is the air speed, $\alpha$ is the relative wind angle, and r is the radius of separation. This is a delay equation that defines the basic relationship between these air-data parameters and actual acoustic pulse time-of-arrival delays between a transmitter and multiple receivers. In certain embodiments, as shown in FIG. 1, the geometry of the receivers $R_\theta$ can be a circular pattern at fixed angles $\theta$ at a radius of r from a transmitter T. Embodiments of finding one or more air data parameters can include an incremental approach, first receiving or determining wind angle (e.g., AOA), then using wind angle to determine for true airspeed (TAS), then optionally using wind angle & TAS to determine for speed-of-sound (SOS), and then optionally using SOS to determine for static air temperature (SAT).

An embodiment for determining wind angle is disclosed above. An additional embodiment of a process for determining wind angle is described below.

Even if the true AOA or other wind angle does not align with any receiver, we can interpolate to estimate this angle. Since the delay equation is minimum at angle-of-attack, i.e., $$\alpha = \operatorname*{argmin}_{\theta}[\tau_\theta],$$

and it is symmetrical about $\alpha$, i.e.:

$$\tau_{\alpha+\Delta\theta} = \tau_{\alpha-\Delta\theta}$$

this suggests fitting the receiver delays bracketing the minimum with a parabola. Since each receiver delay measurement will be corrupted by measurement noise and the minimum may occur between two receivers, it is best to curve fit a function to receiver delays and extract the minimum from the fitted function.

Fit this to the second order equation:

$$\tau(\theta) = a\theta^2 + b\theta + c,$$

which has minimum at:

$$\theta = -\frac{b}{2a}.$$

Denote the minimum measured delay and its receiver angle as the point $(\theta_0, \tau_0)$, then denote the points on either angular side of this as $(\theta_-, \tau_-)$ and $(\theta_+, \tau_+)$ This yields an AOA estimation formula:

$$\hat{\alpha} = \theta_0 - \left(\frac{\theta_+ - \theta_-}{4}\right)\left(\frac{\tau_+ - \tau_-}{t_+ - 2t_0 + t_-}\right)$$

An embodiment of a process for determining true airspeed TAS is described below. For any two distinct receiver delays $\tau_{\theta_n}$ and $\tau_{\theta_m}$, their reciprocal difference is:

$$\frac{1}{\tau_{\theta_n}} - \frac{1}{\tau_{\theta_m}} = \frac{V}{r}\{\cos(\alpha - \theta_n) - \cos(\alpha - \theta_m)\},$$

and solving for true airspeed estimate:

$$\hat{V} = r\frac{\frac{1}{\tau_{\theta_n}} - \frac{1}{\tau_{\theta_m}}}{\cos(\alpha - \theta_n) - \cos(\alpha - \theta_m)}.$$

An embodiment of a process for determining a speed of sound SOS is described below. For any two distinct receiver delays $\tau_{\theta_n}$ and $\tau_{\theta_m}$, their reciprocal sum is $$\frac{1}{\tau_{\theta_n}} + \frac{1}{\tau_{\theta_m}} = 2\frac{C_0}{r} + \frac{V}{r}\{\cos(\alpha - \theta_n) + \cos(\alpha - \theta_m)\},$$

and solving for the speed of sound estimate $$\hat{C}_0 = \frac{r}{2}\left(\frac{1}{\tau_{\theta_n}} + \frac{1}{\tau_{\theta_m}}\right) - \frac{V}{2}\{\cos(\alpha - \theta_n) + \cos(\alpha - \theta_m)\}.$$

For numerical reasons, ideally one would pick a pair of receivers on opposite sides of the receiver circle, both at right angles to the AOA. Since not all receivers will yield delay measurement due to shadowing effects, the next best is pick a pair as close to 180 degrees apart as possible and as close to 90 degrees away from α as possible. Mach number can be determined using the TAS and the speed of sound as appreciated by those having ordinary skill in the art.

An embodiment of a process for determining a static air temperature (SAT) Using the speed of sound in knots, the static air temperature in Celsius is then estimated as:

$$\hat{T}_s = \left(\frac{C_0}{\kappa}\right)^2 - 273.15, \text{ where } \kappa = 38.96695 \frac{\text{knots}}{\sqrt{K^\circ}},$$

or equivalently for speed of sound in meters/sec to degrees Celsius:

$$\hat{T}_s = \left(\frac{C_0}{\kappa}\right)^2 - 273.15, \text{ where } \kappa = 20.04637 \frac{\text{meters/sec}}{\sqrt{K^\circ}}$$

Signal loss between the transmitter and any receiver is driven by geometrical scattering, molecular absorption, and turbulent scattering. The first two effects are omni-directional so effect all receivers equally. Geometrical scattering is caused by the sound energy spreading out as it propagates ways from its source. Molecular absorption is caused by sound energy being converted to heat as the sound wave propagates through the air.

Turbulent scattering, caused by local gradients in wind velocity and temperature that induces fluctuations in phase and amplitude of the sound waves as they propagate through the air, is directional. Since the transmitter and receivers are flush mounted the velocity boundary layer effect will bend the sound waves traveling upstream away for the mount surface and sound waves traveling downstream into the mount surface. This bending causes an increase in signal strength in downstream receivers and a loss, or shadowing of signal strength in upstream receivers. The sound propagating at right angles to the airflow are not bent. Only at low airspeeds will all receivers have sufficient signal strength to separate the acoustic pulses from background noise. At higher airspeeds the upstream receivers will be "shadowed" due to signal loss through the air. This shadowing effect becomes more significant at higher airspeeds as shown in FIG. 11. The faster the velocity, the less receivers away from the velocity vector will receive a signal and are thus effectively shadowed. The shadowed portion of the arc the can be referred to as the "wedge angle," and there may be no need for sensors that are always shadowed. (e.g., outside of about 90 degrees of wedge angle for normal operations in commercial aircraft).

Likewise, temperature gradient effect will shadow receivers if the mount is warmer than the surrounding air and reinforce signals if the mount is cooler than surrounding air. The thermal gradient shadowing is a transient effect as the mount temperature will cool due to large volume of airflow. As a consequence of this shadowing effect, all airspeed information needs to be extracted from delay data gathered from the non-shadowed receivers.

This is in direct contradiction to the way typical acoustic wind measurements are made, using pairs of receivers 180 apart from each other. As described above, delay measurement logic can include a threshold time at which it is assumed that the receiver is not ever going to receive a signal, then determine that the receiver is "shadowed" and input null entry.

As described herein, a pulse command from the pulse control timing logic of the pulse control module 511 can be converted into an acoustic pulse by the transmitter 12. The pulse control module 511 can create a shaped waveform designed to be robust to the ambient noise so that the delay measurement modules 509 can extract pulse timing information in the presence of noise corruption. Pulse control module 509 can also time stamp the pulse transmit time so that the pulse arrival times can be determined by the modules 509. The delay measurement modules 509 can extract the delay between the transmitter pulse command and received waveforms and outputs the time delay between them as τ. For clarity FIG. 5 shows the relative timing of the transmitted and received signals. For illustrative purposes the depicted pulse shape is a sinusoidal wave-train, but could be a simple Gaussian pulse or more complicated pattern depending on the difficulty of extracting the received pulse from the background noise.

As described above, each delay measurement module can include an analog-to-digital converter sampling at a sufficient rate to determine the delay time with sufficient resolution for accurate airspeed measurements (e.g., in fractions of a microsecond). A MUX 539 can gather measured delay times/data into an indexable list. The shadowed receiver delays can be included in the list as null entries so that subsequent blocks can dynamically adapt to the varying length and distribution of non-shadowed entries.

Curve fit module 521 can accept the set of delay differences as shown which are points along the one of the curves. The curve fit module 521 can determine the best least-squares fit to the non-null list entries, and the resulting output parameters can define a curve equation denoted as $\tau_\theta$.

The wind angle module 517 can use the curve fit function $\tau_\theta$ and solve for the angle $\alpha$ where the function is minimized as described above. This minimizing angle can be output as the wind angle $\alpha$. The airspeed module 525 uses the wind angle estimate from wind angle module 517 and the measured delay list $\tau_n$ to compute the true airspeed V as described above.

The SOS module 529 can use the estimated wind angle and true airspeed to compute the estimated speed of sound $C_O$ as described above. The estimated true airspeed is divided by $C_O$ to compute the Mach number M. The static air temperature module 535 can compute the static temperature (Ts) as described above.

Using an ultrasonic angle-of-attack sensor design, which captures acoustic pulse time-of-flight at multiple angles with respect to the aircrafts airflow, provides the following benefits: a single unit capable of measuring true airspeed and wind angle (e.g., angle-of-attack or angle of sideslip), a direct measurement of the speed of sound to compute current, Mach number and static air temperature, unobstructed airflow across the sensor, eliminating airflow disturbance and drag, no mechanical moving parts, which results in higher bandwidth and update rate for wind angle, lower de-icing requirements as no sensor component faces directly into the airflow, and true positive failure detection when receivers cannot extract pulse signals (due to a multitude of reasons, including icing) in contrast to pitot-static ports icing to fixed reasonable, but wrong, pressures.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An acoustic airspeed sensor system, comprising:
   at least one acoustic transmitter configured to provide an acoustic pulse;
   a plurality of acoustic receivers, including at least:
      a first acoustic receiver positioned at a first radial distance from the at least one acoustic transmitter, the first acoustic receiver configured to:
         receive the acoustic pulse at a first time; and
         output a first receiver signal;
      a second acoustic receiver positioned at a second radial distance from the at least one acoustic transmitter, the second acoustic receiver configured to:
         receive the acoustic pulse at a second time; and
         output a second receiver signal; and
   an air data module operatively connected to the first acoustic receiver and the second acoustic receiver, the air data module configured to:
      receive the first receiver signal and the second receiver signal;
      determine a first signal delay between receiving the first receiver signal and transmission of the acoustic pulse by the acoustic transmitter;
      determine a second signal delay between receiving the second receiver signal and transmission of the acoustic pulse by the acoustic transmitter;
      receive or determine a wind angle;
      determine true air speed (TAS) based upon the first signal delay, the second signal delay, and the wind angle; and
      output a TAS signal indicative of the TAS.

2. The airspeed sensor system of claim 1, wherein the air data module includes one or more delay measurement modules operatively connected to a pulse control module and the first and/or second acoustic receiver, wherein the pulse control module is operatively connected to the transmitter and configured to cause the transmitter to send the acoustic pulse at a send time, wherein the one or more delay measurement modules are configured to compare the send time and the first time to determine the first signal delay and output first delay data indicative thereof, wherein the one or more delay measurement modules are configured to compare the send time to the second time to determine the second signal delay and output second delay data.

3. The airspeed sensor system of claim 2, wherein the air data module includes a wind angle module operatively connected to the one or more delay measurement modules to receive the first delay data and the second delay data and configured to determine the wind angle based thereon, and to output wind angle data.

4. The airspeed sensor system of claim 3, wherein air data module includes a curve fit module configured to curve fit the first delay data and the second delay data and to output curve fit data to the wind angle module.

5. The airspeed sensor system of claim 3, wherein the air data module includes an airspeed module operatively connected to the wind angle module to receive wind angle data therefrom, wherein the airspeed module is operatively connected to the one or more delay measurement modules to receive the first delay data and the second delay data, wherein the airspeed module is configured to determine TAS based on the wind angle, the first delay data, and the second delay data, and to output the TAS signal.

6. The airspeed sensor system of claim 5, wherein the air data module includes a speed of sound (SOS) module operatively connected to the airspeed module to receive the TAS signal, wherein the SOS module is operatively connected to the one or more delay measurement modules to receive the first delay data and the second delay data, wherein the SOS module is operatively connected to the one or more delay measurement modules to receive the first delay data and the second delay data, wherein the SOS module is operatively connected to the wind angle module to receive wind angle data, wherein the SOS module is configured to determine a SOS based on the TAS signal, the first and second delay data, and to output SOS data.

7. The airspeed sensor system of claim 6, wherein the SOS module is configured to determine Mach number from the SOS and to output a Mach number signal.

8. The airspeed sensor system of claim 6, wherein the air data module includes a static air temperature module operatively connected to the SOS module to receive the SOS data to determine a static air temperature (SAT) based on the SOS, and to output a SAT signal.

9. The airspeed sensor system of claim 2, wherein the air data module includes a multiplexer (MUX) between the one or more delay measurement modules and at least one other module of the air data module, the MUX configured to receive the first delay data and the second delay data from the one or more delay measurement modules and to multiplex the data.

10. The airspeed sensor system of claim 1, wherein the first radial distance and the second radial distance are the same.

11. The airspeed sensor system of claim 1, wherein the first and second acoustic receivers comprise microelectromechanical systems (MEMS) microphones.

12. The airspeed sensor system of claim 1, wherein the air data module is configured to determine if an acoustic receiver is shadowed by setting a maximum time for response, and to ignore any signals from the shadowed acoustic receivers.

13. A computer implemented method, comprising:
   emitting an acoustic pulse using at least one acoustic transmitter;
   receiving, at a first time, the acoustic pulse using a first acoustic receiver positioned at a radial distance from the at least one acoustic transmitter; providing a first receiver signal from the first acoustic receiver in response to receiving the acoustic pulse;

receiving, at a second time, the acoustic pulse using a second acoustic receiver positioned at the radial distance from the at least one acoustic transmitter and aligned with an axis that extends through each of the at least one acoustic transmitter and the first acoustic receiver;

determining a first signal delay between the first acoustic receiver and the acoustic transmitter;

determining a second signal delay between the second acoustic receiver and the acoustic transmitter;

determining a true airspeed (TAS) based upon the first signal delay, the second signal delay, and a wind angle; and outputting a TAS signal to an aircraft system.

14. The method of claim 13, further comprising determining the wind angle based on the first signal delay and the second signal delay.

15. The method of claim 13, further comprising determining a speed of sound (SOS) based on the wind angle, the TAS, the first signal delay, and the second signal delay.

16. The method of claim 15, further comprising determining a Mach number based on the SOS and outputting the Mach number to an aircraft system.

17. The method of claim 15, further comprising determining a static air temperature (SAT) based on the SOS and outputting the static air temperature to an aircraft system.

* * * * *